PROCESS AND INSTALLATION FOR MANUFACTURING FIBER REINFORCED SANDWICH TUBE
Filed April 27, 1972
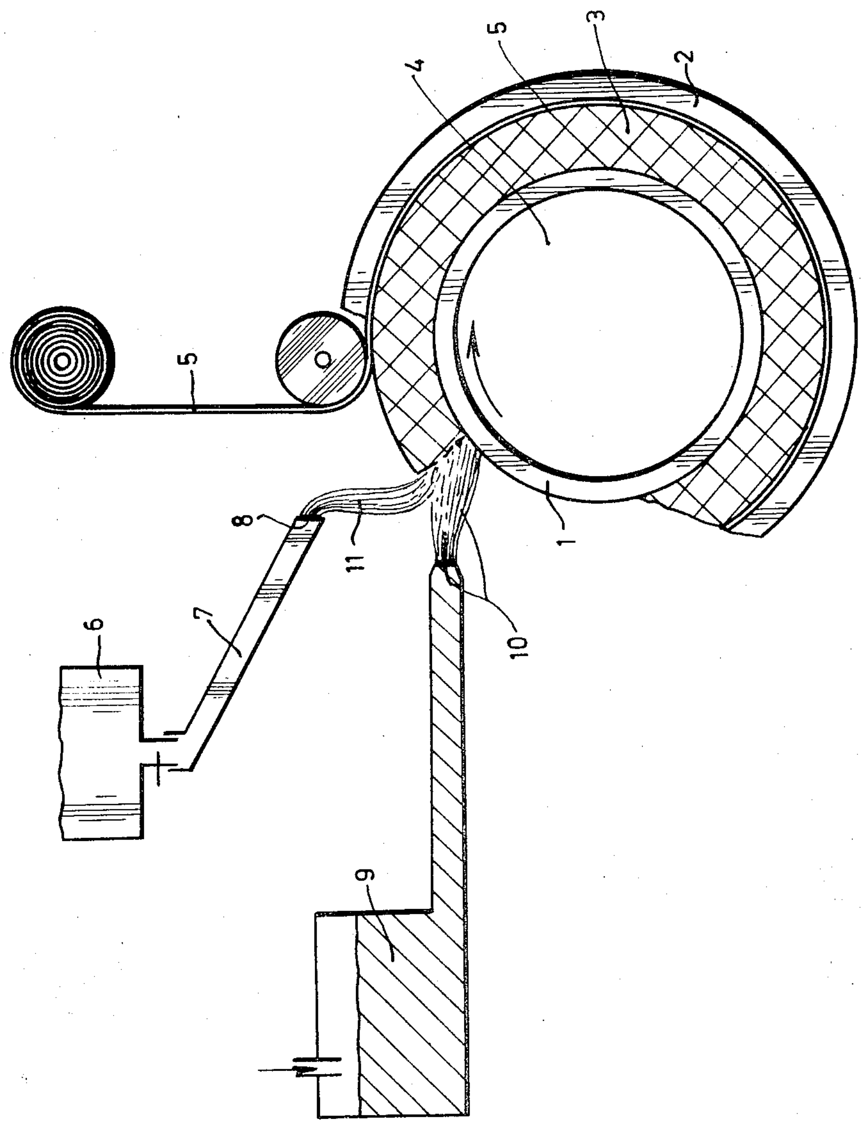

United States Patent Office 3,799,818
Patented Mar. 26, 1974

1

3,799,818

PROCESS AND INSTALLATION FOR MANUFACTURING FIBER REINFORCED SANDWICH TUBE

Hein Bulters, Vroomshoop, Gerrit Heidemann, Oldenzaal, and Warner Jan de Putter, Hardenberg, Netherlands, assignors to Industriele Onderneming Wavin N.V., Zwolle, Netherlands Filed Apr. 27, 1972, Ser. No. 248,161
Claims priority, application Netherlands, Apr. 29, 1971, 7105953
Int. Cl. B32b *5/16;* B31c *13/00;* B65h *81/00*
U.S. Cl. 156—62.2 12 Claims

ABSTRACT OF THE DISCLOSURE

The invention relates to a sandwich tube comprising an inner and an outer fiber reinforced layer of thermosetting resin and an intermediate layer therebetween consisting of inorganic filler material coated with thermosetting resin and obtained by spraying a finely divided resin into a mass of loosely held inorganic filler material. A nonwoven is present between the intermediate layer and the outer fiber reinforced layer.

DISCUSSION OF THE PRIOR ART

The invention relates to a method for manufacturing a flexible tube comprising at least an inner fiber reinforced layer of a thermosetting resin, an outer fiber reinforced layer of a thermosetting resin, and between the two layers at least one intermediate layer consisting of inorganic filler with a thermosetting resin.

Such a method and a tube obtained thereby are known per se.

In this known method for manufacturing a tube having a cover layer of a fiber reinforced thermosetting layer either a centrifugal molding process or a winding process on a mandrel are used. When a winding method on a mendrel is used an intermediate layer is provided consisting of 40% by weight of polyester resin and 60% by weight of powderous inorganic filler material.

The preparation of this intermediate layer by mixing a mixture of 70% by weight of a normal polyester resin and 30% by weight of a soft polyester resin with a mixture of 60% by weight of sand and 40% by weight of quartz powder is also known in the art. In this technique the sand has a particle size ranging from 0.125 to 0.5 mm., while the quartz powder has a particle size of less than 0.074. Thus, normal sand cannot be applied, and particular sand fractions must first be sifted out.

The above cited methods have the drawback that the thermosetting resin has to be mixed with the filler particles in a separate vessel. Mixing will involve an increase in temperature which is attended by a certain pre-polymerization of the thermosetting resin. Moreover it is difficult to obtain well coated particles when such a mixing is performed according to the known methods, so that at particular locations the filler particles are not enveloped and occur as agglomerates of filler particles, carrying an outer thermosetting resin layer, in a manufactured tube. It is obvious that such masses of loose inorganic filler particles impair the strength properties of the tube formed. On the other hand it is rather difficult to prevent the occurrence of inclusions of air in the mass which affect the qualities of the tube in a detrimental way.

SUMMARY OF THE INVENTION

It is an object of the invention to provide a method in which the aforementioned difficulties are obviated so that a tube with inorganic filler particles can be obtained which has markedly better properties than the known tubes.

This object is attained according to the invention by the

2 arrangement that on an inner fiber reinforced layer of thermosetting resin there is provided an intermediate layer of coated filler particles which are obtained by spouting a stream of thermosetting resin, atomized under pressure, into a mass of loosely held particles of inorganic material, whereupon an outer layer of fiber reinforced thermosetting resin is deposited on the outer side of the intermediate layer consisting of particles which are still mutually connectable through the resin, whereafter the resinous coating on the particles and the resin in said layers is further cured.

This method lends itself in particular to the manufacture of tubes of the aforementioned type with a very small quantity of resin whilst using a normal commercially available sand without isolating particular fractions.

It has been found that with the known method when a mixture of 16% by volume of resin and 84% by volume of sand is used weak tubes are obtained. For strong tubes a quantity of resin which amounts to at least 40% by volume is recommended. Particularly in case of low percentage figures of resin the intermediate layer, because of insufficient impregnation of filler and air inclusions tend to crack when loads are applied, whereby the tube looses its desired properties.

To overcome this problem it has been suggested that glass fibers be wound on a mandrel and that sand particles be scattered between the various winding so as to obtain a tube constructed from various layers.

Those layers have the drawback that although no formation of cracks occurs moisture easily issues from the inner side of the tube because the tube is not moisture tight, and the occurrence of air inclusions. The resin layers are very thin in such tubes.

An excellent tube is obtained when inorganic particles are applied, a considerable quantity of which has a size greater than 0.5 mm. and preferably 50% or more have a size greater than 0.5 mm. The inorganic filler particles consist of sand particles with a size ranging from 0.5 mm. to 4 mm. It has been found that a regular construction of the filler particles in the range of 0.5 mm. to 3 mm. results in a marked improvement in the properties of the tube.

It has appeared that by spouting liquid thermosetting resin particles into a mass of loosely held inorganic particles a tube with very good mechanical properties can be obtained which could not be expected because of the low resin content.

Insofar as this application is concerned thermosetting resin atomized under pressure means the spouting of liquid thermosetting resin by means of high pressure. This expression also covers the case wherein the resin is spouted by means of an air current and venturi effect but the former possibility is preferred.

According to a very advantageous embodiment a stream of thermosetting resin particles, preferably spouted at a pressure ranging from 5 to 200 atmospheres, is spouted into a stream of falling inorganic particles and the particles provided with resin are thrown by this stream on the inner layer. In this way a compression of the inorganic particles by the thermosetting resin is obtained and a further condensation is produced since, by means of the force of the stream of the thermosetting resin particles, the mass of inorganic particles with thermosetting resin are thrown on the outer side of the inner layer.

It has been found that it is advisable to arrange that the contact between the inorganic particles and the resin particles is effected at a temperature of over 20° C. Thus, one preference, according to the invention, is that resin particles with a temperature of over 23° C. be brought into contact with the sand particles.

It has been found that very good results are obtained when the inorganic particles are preheated while the resin particles are supplied without additional heating. The temperature of the resin particles or said particles should on the other hand be selected in such a way that the resin particles, as soon as they come into contact with the other resin particles, still have sufficient curing ability to interconnect the particles.

For cold hardening resins the temperature of the particles ranges preferably from 23° to 90° C. and for other resins temperatures from 23 to 120° C. can be used. This temperature can easily be imparted to the particles since for the removal of moisture the inorganic particles, mostly, in the shape of sand particles, are heated for drying purposes.

Due to the presence of a small quantity of resin in the mass of inorganic particles with resin it is necessary, during the provision of the intermediate layer, to provide the parts disposed with a cover layer in the shape of a fabric, fibrous non-woven and the like which under tension are wound around the outer side of the intermediate layer.

In the method according to the invention the inner fiber reinforced layer consists preferably of a layer obtained by winding glass fiber rovings on which a thermosetting resin in the shape of e.g. a polyester resin or epoxy resin, or a mixture of thermosetting resins is provided.

For a tube resisting 6 atm. inner overpressure with a diameter of 600 mm. the thickness of this layer ranges from 1 to 3 mm. and is preferably 2 mm. The same thickness should be observed for the outer fiber reinforced layer.

The intermediate layer has a thickness ranging from 5 to 12 mm. It is evident that for tubes of another pressure class and/or diameter these thickness measurements should be different.

The quantity of resin in the intermediate layer ranges between 40 and 5% by volume and preferably from 10 to 30% by volume.

The quantity of inorganic particles ranges from 60 to 95% by volume and preferably from 70 to 90% by volume.

According to a very advantageous embodiment the amount of sand particles used ranges from 14 to 18% by volume and from 82 to 86% by volume.

In general sand particles in the shape of a commercially available sand with a graduation ranging from 0.1 to 3.0 mm. are used as inorganic particles.

On the other hand it is not advisable to select a size of particles of over 4.0 mm. since this can also give rise to difficulties on mixing. It is not advisable to use smaller material.

It is, however, possible to use foamed clay particles.

It is not yet possible to give an explanation for the good properties of the tube obtained according to the method in conformity with the invention but it seems that the following factors play an important part:

(a) spouting the stream of resin in a finely divided state into a mass of loose inorganic particles,
(b) throwing the inorganic particles with synthetic resin, due to the force of the stream of resin, on the outer side of the inner layer,
(c) winding a fabric or non-woven from inorganic or organic material in order to obtain a proper condensation of the sand particles with the resin on the outer side of the inner layer, and
(d) causing the sand particles to come into contact with the resin at a temperature of over 20° C.

It is, however, not yet clear to what extent the spouted thermosetting resin functions as a coating for the inorganic particles or just gives rise to the formation of aggregates, the thermosetting resin particles constituting the cores and the sand particles adhering to the thermosetting resin as a covering layer. Presumably the two processes take place when the sand particles contact the thermosetting resin.

Although hereinbefore there is question of a particular distribution of the sand one is not bound thereby and also exclusively coarse sand can be used, a gradual graduation in the mass of sand is however desired. The covering layer may consist of a layer of thermosetting resin, whether or not reinforced by reinforcing material. It is, however, also possible to use a thermoplastic material therefor.

The invention comprises also an apparatus for performing the method according to the invention comprising a mandrel, means for winding an inner layer of reinforcing fibers, and means for applying an intermediate layer consisting of a thermosetting resin with particles of an inorganic material, characterized in that the apparatus is provided with a device for loosening the particles of inorganic material from each other, and with a distributing member for spouting a stream of finely divided thermosetting resin particles into the mass of loose particles of inorganic material.

This apparatus consists advantageously of a supply container for a thermosetting resin with a nozzle for distributing the thermosetting resin in small particles, a supply container for inorganic particles, a supply opening for the supply of inorganic particles opening over the mandrel and in spaced relationship therefrom, the opening of the nozzle being adjustable in such a way that the resin strikes the inorganic particles, issuing from the supply opening, in a point situated at a distance over the mandrel.

For performing the method according to the invention a device as represented in the figure is advantageously used in which a part of a tube according to the invention is shown. This device comprises a mandrel 4 which is provided with a layer 1 of glassrovings which before being applied are impregnated with a thermosetting resin.

For the provision of these rovings reference is made to e.g. the state of the art since here a commonly known method is concerned.

An intermediate layer consisting of inorganic particles with a thermosetting resin is applied on the outer side of the inner layer formed from glass fibers with a thermosetting resin, whereupon a glass fiber non-woven or glass fabric 5 is wound around the inner layer, while subsequently glassfibers impregnated with a thermosetting resin are wound therearound which together constitute the outer reinforcing layer. Instead of a non-woven of glass also non-wovens of polyester fibers can be used.

It is also possible to provide the glass fiber non-woven with a thermosetting resin as an outer layer.

A supply container 6 for the particles with a discharge gutter 7, the discharge opening 8 of which is spaced up from the mandrel, enables the intermediate layer 3 to be applied.

The device is also provided with a supply container for the resin with a nozzle 10 through which by applying pressure the thermosetting resin can be spouted. The nozzle 10 is directed in such a way that the spouted thermosetting resin hits the path 11 of the falling inorganic particles in a point situated over the mandrel. For the rest it is advisable to direct the resin jet in some cases in such a way that the inorganic particles land in the area between the inner fiber reinforced layer and the fibrous non-woven or fabric 5.

Due to the adjustment of the inclination of the nozzle the thermosetting resin with inorganic particles can be deposited at any desired location on the rotating mandrel 4. Immediately after the formation of the layer of filling material a fibrous non woven is wound therearound, e.g. consisting of glass fiber material, but also plastics can be used therefor, like e.g. a polyester fiber fabric or polyester non woven.

The fibrous non woven is wound at a particular pressure round the whole in order to achieve a further compression of the resin with inorganic particles.

This may be a fibrous non woven band with a width of 20 cm. which with a tension of over 2 kg. is wound around the intermediate layer. The maximal pressure depends on the viscosity of the resin, the kind of inorganic material and the strength of the fibrous non woven or the fabric. In dependence of the viscosity of the resin one should operate at different pressures on spouting the resin through the nozzle.

The viscosity can be regulated by admixing a diluent, such as styrene or by heating the resin. In the latter case it should be avoided that the resin in the nozzle becomes too viscous or, in case of "heat setting" thermosetting resins, gels.

The pressure ranges from 5 to 200 atm. and those skilled in the art can easily determine by means of the viscosity the desired pressure in order to obtain a cloud shaped mass of resin particles.

The higher the viscosity the higher obviously the spouting pressure should be. In general it is advisable to select a pressure ranging from 25 to 200 atm. The arrangement also depends on the distance from the nozzle to the falling particles.

It is also possible to use a two component spout with an inner mixing step in the spouting head. In this way a resin with a catalyst and a resin with an initiator can be spouted onto the sand particles.

DESCRIPTION OF A PREFERRED EMBODIMENT

Example I

Glass roving band with a width of 180 mm. is after soaking in a bath of polyester resin (Palatal P 8®) wound around a rotating mandrel with an outer diameter of 600 mm. until a layer thickness of 2 mm. is obtained.

Thereupon sand particles with a temperature ranging from 35 to 45° C. are supplied via the gutter 7, which sand particles via the discharge opening 8 fall down. The sand has a particle size distribution ranging from 0.1 to 3 mm. A suitable distribution is e.g. 20% with a particle size ranging from 0.1 to 0.5 mm., 40% ranging from 0.5 to 1.0 mm., 25% ranging from 1.0 to 2.0 mm. and the rest for the greater part ranging from 2.0 to 3.0 mm. Preferably, the particle size of the sand particles increases progressively.

A resin jet is spouted from the resin container 9, via the nozzle 10 with an opening ranging from 0.8 to 2 mm., with such a force that a resin stream resembling a cloud is obtained. The resin stream in the shape of resin particles of about 0.1 mm. hits the sand particles at a previously adjusted height above the mandrel. The resin particles may also be about 0.1–0.2 mm.

The quantity of resin which is spouted and the quantity of sand particles supplied are related to each other in such a way that a mixture is obtained of 86% by volume of sand and 14% by volume of resin. This corresponds to 82 parts by weight of sand and 18 parts by weight of resin. Due to the force of the stream of polyester resin particles the whole is deposited on the outer side of the inner layer consisting of glass rovings. The resin particles which at the time of deposit should have sufficient curing ability ensure a mutual cementation. After the deposit the glass fibrous non woven 5 is wound around the intermediate layer. The tension of the glass fibrous non woven is selected in such a way that the formed layer is compressed to the desired thickness. On the fibrous non woven a layer of a thermosetting resin can be deposited but after the provision of the fibrous non woven also directly an outer fiber reinforced layer may be provided by winding round glass rovings impregnated with polyester resin. Instead of a glass non woven it is possible to use plastics non wovens such as polyester non wovens. It should be noted that the qualities of the non wovens should be such that resin can pass through the non woven but the filler particles are maintained at their position.

Thereupon the resin is allowed to harden in a way known per se. In case of thermosetting resins this is e.g. effected by heating.

The tube obtained has an inner fiber reinforced layer of 2 mm., and outer fiber reinforced layer of likewise 2 mm. and an intermediate layer ranging from 7 to 8 mm.

This tube has in spite of the small quantity of resin the following mechanical properties:

5% deformation at a vertical pressure of 1.6 ton per linear metre,

20% deformation at a vertical pressure (fracture) of 4 tons per linear metre.

Similar results are obtained with epoxy-resins.

Example II

The Example I is repeated, the sand particles being, however, supplied at a temperature of 10° C. and the resin at ambient temperature.

The resin is spouted at a pressure of 100 atmospheres.

The tube obtained has the following properties:

5% deformation at a vertical pressure of 1.2 ton per linear metre, and 20% deformation at a vertical pressure (fracture) of 2, 3 tons per linear metre.

It may be advantageous to select such a pressure on spouting the resin that the particles obtained have a size which is approximately equal to that of the inorganic particles. If desired the size of the resin particles may also be smaller than this size of the inorganic particles.

Example III

The Example I is repeated, however, that 40% by volume of a polyester resin (Palatal®) is used. In this case too, a very good result is obtained even when inorganic filler particles with a size of less than 0.074 mm., in a quantity of 40% by weight are used, while the remaining 60% by weight consist of sand particles with a size ranging from 0.125 to 0.5 mm. When these particles are supplied at a temperature of 60° C. the special advantages of the method are obvious, since a tube is obtained with markedly better properties than the known tubes. Similar results are obtained at a temperature of the particles of 90° C. and 120° C. Instead of heated sand particles also heated resin particles are useful but heated sand is preferred. At any rate it is preferred that the resin particles and sand particles should contact each other at a temperature of more than 23° C.

Example IV

On a continuously unrolling ribbon, which continually winds up again, and forming a continuous mandrel is wound a layer of glass fibers soaked in a thermosetting resin, whereupon on this layer a layer of a non woven material e.g. a polyester non woven is wound on which are the coated inorganic filler particles with thermosetting resin of Example 1. As a thermosetting resin, is selected a polyester resin. Thereupon a layer of a nonwoven is wound around this layer of compressing the filler particles and subsequently again a layer of fiber material soaked in thermosetting resin.

This fiber material consists of glass rovings.

Such a tube, too, lends itself very well for application in industries on account of its favorable strength properties.

It is recommended to provide the ends of the tube with an end part consisting of several layers of glass rovings reinforced thermosetting resin material, to prevent penetration of moisture into the sandwich layer of filler particles.

What we claim is:

1. A method of manufacturing a flexible tube, comprising the steps of:

(a) winding a fiber reinforced layer of thermosetting resin to porvide an inner tube layer;

(b) providing a stream of free falling inorganic filler particles;

(c) spouting atomized resin transversely into the stream of free falling filler particles, thereby coating and moving filler particles against the outside surface of the inner tube;

(d) rotating the inner tube to provide a layer of the coated particles on the outside surface of the inner tube;

(e) winding under tension over the layer of coated particles a fibrous non-woven or fabric layer permeable to the resin but impermeable to the particles for compressing the particles together;

(f) winding over the permeable layer an outer fiber reinforced layer of thermosetting resin; and (g) simultaneously curing the applied layers of resin.

2. A method according to claim 1, wherein the inorganic filler contains a quantity of particles with a diameter of more than 0.5 mm. with a progressively increasing size.

3. A method according to claim 2, wherein at least 50% of the inorganic particles has a diameter greater than 0.5 mm., and preferably 80% has a diameter ranging from 0.5 to 3 mm.

4. A method according to claim 1, wherein the filler particles are caused to contact the resin particles whilst heating the resin particles and inorganic particles in such a way that on the contact surface the temperature is at least about 23° C. when the particles come into contact with each other.

5. A method according to claim 4, wherein the inorganic particles are pre-heated up to a temperature ranging from 30 to 120° C. and preferably from 30 to 40° C.

6. A method according to claim 4, wherein the resin particles are pre-heated up to a temperature ranging from 23 to 90° C. and preferably from 30 to 45° C.

7. A method according to claim 1, wherein the resin particles which are brought into contact with the inorganic particles have substantially a size which approximately corresponds with the size of the inorganic filler particles.

8. A method according to claim 1, wherein the inner and outer layers of the fiber reinforced thermosetting resin are obtained by winding rovings of inorganic fiber material.

9. A method according to claim 1, wherein the filler particles are coated with resin particles obtained by spraying the resin at a pressure ranging from 25 to 200 atmospheres.

10. A method according to claim 1, wherein in a continuous process the coated inorganic filler particles are provided on a nonwoven band of glass or plastics material which is wound on a mandrel.

11. A method according to claim 1, wherein the end of the tube is provided with a colsed end winding of fiber reinforced thermosetting resin.

12. Apparatus for making a flexible tube from fiber reinforced thermosetting resin, inorganic filler particles, resin, and a non-woven or fabric layer permeable to the resin but impermeable to the filler, comprising:

(a) a rotatable mandrel;

(b) means for winding a layer of the fiber reinforced thermosetting resin on the mandrel;

(c) means for providing a free falling stream of the inorganic filler particles;

(d) means for spouting resin in atomized form transversely into the stream of free falling filler particles, whereby a coating of resin coated particles is applied to the outside surface of a reinforced layer on the mandrel; and (e) means for applying under tension to resin coated particles on the reinforced layer the fibrous non-woven or fabric layer to compress the particles together.

References Cited

UNITED STATES PATENTS

| | | | |
|---|---|---|---|
| 3,700,512 | 10/1972 | Pearson et al. | 156—173 |
| 3,655,468 | 4/1972 | Bastone et al. | 156—173 |
| 3,706,615 | 12/1972 | Nishiama et al. | 156—173 |
| 3,379,591 | 4/1968 | Bradley | 156—173 |
| 3,520,749 | 7/1970 | Rubenstein | 156—173 |
| 3,629,028 | 12/1971 | McLarty et al. | 156—321 |
| 3,623,930 | 11/1971 | Grosh | 156—173 |

DANIEL J. FRITSCH, Primary Examiner

U.S. Cl. X.R.

156—69, 162, 165, 171, 172, 173, 187, 191, 276, 322, 425, 446